United States Patent Office 3,787,400
Patented Jan. 22, 1974

---

3,787,400
1,2,3,4-TETRAHYDRO - 11 - HYDROXYPYRAZINO [1,2-b]-1,2 - BENZOTHIAZINE - 1,3 - DIONE 6,6-DIOXIDE
Chris Royce Rasmussen, Ambler, Pa., assignor to McNeil Laboratories, Inc.
No Drawing. Filed Oct. 2, 1972, Ser. No. 294,119
Int. Cl. C07d 93/02
U.S. Cl. 260—243 R       1 Claim

ABSTRACT OF THE DISCLOSURE

The compound herein is 1,2,3,4-tetrahydro-11-hydroxypyrazino-[1,2-b]-1,2-benzothiazine-1,3 - dione 6,6-dioxide, useful for its ultra-violet absorbing properties.

---

This invention relates to the novel compound, 1,2,3,4-tetrahydro - 11 - hydroxypyrazino[1,2-b] - 1,2 - benzothiazine-1,3-dione 6,6-dioxide, and the preparation thereof. Said compound may be represented structurally as follows:

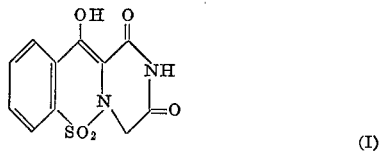

(I)

The compound of Formula I is prepared by simple ring closure of an appropriate lower alkyl 3-carbamoyl-2,3-dihydro - 4 - oxo-4H-1,2-benzothiazine-2-acetate 1,1-dioxide (II) under heat in the presence of sulfuric acid. Said precursor is disclosed in U.S. Pat. No. 3,501,466. This reaction may be illustrated as follows:

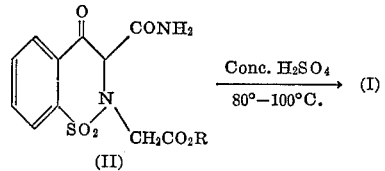

where R is lower alkyl. As used herein "lower alkyl" may be straight or branch chained saturated aliphatic hydrocarbons having from 1 to about 5 carbon atoms, such as, for example, methyl, ethyl, propyl, isopropyl, butyl, pentyl, and the like.

The compounds of this invention absorbs ultra-violet (U.V.) light above 300 nm. ($\epsilon=10,800$ at $\lambda=350$ nm.) and is useful as a U.V. screening material. Because of its general solubility in organic materials, it may be used as a U.V. absorber in plastics and resins, such as, for example, polystyrene, polyethylene, polypropylene, polyacrylics (e.g., methacrylate resins, polyacrylamides, polyacrylonitrile fibers, etc.), polyamide (e.g. nylon) fibers and and polyester fibers. The inclusion of about 0.01–5.0 percent of the absorber, based on the polymer weight, is usually sufficient to render protection against U.V. light, such as in plastic films, filters, etc. The absorber may be incorporated into the mixture of monomers before polymerization to form the polymer or it may be incorporated into the polymer at other stages during its handling, as by milling into the polymer together with other compounding ingredients, or during the spinning of the polymers into fibers, etc.

The following example is intended to illustrate, but not to limit, the scope of the present invention.

EXAMPLE I 1,2,3,4-tetrahydro-11-hydroxypyrazino[1,2-b]-1,2-benzothiazine-1,3-dione 6,6-dioxide To a 1-liter round-bottomed flask is added 13.08 g. (0.0419 mole) of methyl 3-carbamoyl-2,3-dihydro-4-oxo-4H-1,2-benzothiazine-2-acetate 1,1-dioxide. Then 7–8 ml. of concentrated sulfuric acid is added and the mixture is heated on a steam bath and stirred with a glass rod until solution is complete. After 15 minutes a few seed crystals of the product (obtained from a previous experiment by scratching) are added and heating is continued for a further 45 minutes. The near-solid mass is treated with a large excess of ice-water and is stirred to break up the lumps. Filtration and recrystallization from acetone gives about 7.5 g. (64%) of nearly pure product, M.P. 230–234° C. dec.). An additional recrystallization from acetone gives the pure product, 1,2,3,4-tetrahydro-11-hydroxypyrazino-[1,2-b]-1,2-benzothiazine-1,3-dione 6,6-dioxide, M.P. 234–238° C. (dec.).

*Analysis.*—Calcd. for $C_{11}H_8N_2O_2S$ (percent): C, 47.14; H, 2.88; N, 10.00. Found (percent): C, 47.06; H, 3.00; N, 9.85.

What is claimed is:
1. 1,2,3,4 - tetrahydro-11-hydroxypyrazino[1,2-b]-1,2-benzothiazine-1,3-dione 6,6-dioxide.

References Cited
UNITED STATES PATENTS
3,408,347  10/1968  Shavel et al. _____ 260—243

JOHN M. FORD, Primary Examiner

U.S. Cl. X.R.
260—45.8 SN; 252—300; 117—33.3